(12) United States Patent
Sivabalan et al.

(10) Patent No.: US 12,170,611 B2
(45) Date of Patent: Dec. 17, 2024

(54) CONTROL PLANE BASED ENHANCED TI-LFA NODE PROTECTION SCHEME FOR SR-TE PATHS

(71) Applicant: Ciena Corporation, Hanover, MD (US)

(72) Inventors: Muthurajah Sivabalan, Kanata (CA); Sami Boutros, Union City, CA (US); Tao Wang, Ottawa (CA); Ashwath Narasimhan, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 362 days.

(21) Appl. No.: 17/685,469

(22) Filed: Mar. 3, 2022

(65) Prior Publication Data

US 2023/0283542 A1 Sep. 7, 2023

(51) Int. Cl.
H04L 45/28 (2022.01)
H04L 45/00 (2022.01)

(52) U.S. Cl.
CPC ............. *H04L 45/28* (2013.01); *H04L 45/34* (2013.01)

(58) Field of Classification Search
None
See application file for complete search history.

(56) References Cited

U.S. PATENT DOCUMENTS

| | | |
|---|---|---|
| 7,120,792 B1 | 10/2006 | Jacobson et al. |
| 7,197,573 B1 | 3/2007 | Jacobson et al. |
| 7,430,176 B2 | 9/2008 | Nalawade et al. |
| 7,539,191 B1 | 5/2009 | Jacobson |
| 7,684,351 B2 | 3/2010 | Vasseur et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |
| 8,824,331 B1 | 9/2014 | Alaettinoglu et al. |
| 8,937,946 B1 | 1/2015 | Kanna et al. |
| 9,979,629 B2 | 5/2018 | Sivabalan et al. |
| 10,033,623 B2 | 7/2018 | Jain et al. |
| 10,158,558 B1 | 12/2018 | Ward et al. |
| 10,165,093 B2 | 12/2018 | Filsfils et al. |

(Continued)

FOREIGN PATENT DOCUMENTS

| | | |
|---|---|---|
| EP | 3 038 301 B1 | 3/2020 |
| WO | 2021/0967231 A1 | 4/2021 |

OTHER PUBLICATIONS

S. Hegde et al., "Node Protection for SR-TE Paths," draft-ietf-spring-node-protection-for-sr-te-paths-00, Internet-Draft, Intended status: Informational, Sep. 21, 2020, 13 pages.

(Continued)

*Primary Examiner* — Xavier S Wong
(74) *Attorney, Agent, or Firm* — Baratta Law PLLC; Lawrence A. Baratta, Jr.

(57) ABSTRACT

Systems and methods include, in a node in a Segment Routing network, learning an adjacency Segment Identifier (SID) of a directly connected neighbor; and programming forwarding entries including a primary path and backup path associated with the adjacency SID. The programming is only performed for adjacency SIDs of directly connected neighbors, for use as a Point of Local Repair (PLR). This addresses holes in Topology Independent Loop Free Alternative (TI-LFA) node protection scheme for Segment Routing Traffic Engineering (SR-TE) paths.

17 Claims, 5 Drawing Sheets

(56) References Cited

U.S. PATENT DOCUMENTS

| | | |
|---|---|---|
| 10,171,338 B2 | 1/2019 | Filsfils et al. |
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,740,408 B2 | 8/2020 | Ramasamy et al. |
| 10,833,976 B2 | 11/2020 | Saad et al. |
| 10,868,755 B2 | 12/2020 | Filsfils et al. |
| 11,057,278 B1 | 7/2021 | Côte et al. |
| 2014/0269266 A1* | 9/2014 | Filsfils .................... H04L 45/22 370/228 |
| 2015/0023156 A1 | 1/2015 | Császár et al. |
| 2015/0271034 A1 | 9/2015 | Kanna et al. |
| 2016/0057049 A1 | 2/2016 | Jacobson et al. |
| 2016/0173366 A1* | 6/2016 | Saad ...................... H04L 45/22 370/389 |
| 2016/0191324 A1 | 6/2016 | Olofsson et al. |
| 2019/0297017 A1 | 9/2019 | Pignataro et al. |
| 2019/0379601 A1 | 12/2019 | Khan et al. |
| 2020/0112495 A1 | 4/2020 | Attarwala et al. |
| 2020/0153856 A1 | 5/2020 | Nainar et al. |
| 2020/0220811 A1 | 7/2020 | Shah |
| 2021/0014146 A1* | 1/2021 | Chen ...................... H04L 67/56 |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |
| 2022/0360525 A1* | 11/2022 | Hu ......................... H04L 45/50 |

OTHER PUBLICATIONS

May 10, 2023, International Search Report and Written Opinion for International Patent Application No. PCT/US2023/013964.

* cited by examiner

CONTROL PLANE BASED ENHANCED TI-LFA NODE PROTECTION SCHEME FOR SR-TE PATHS

FIELD OF THE DISCLOSURE

The present disclosure generally relates to networking. More particularly, the present disclosure relates to systems and methods for a control plane based enhanced Topology Independent Loop Free Alternative (TI-LFA) node protection scheme for Segment Routing Traffic Engineering (SR-TE) paths.

BACKGROUND OF THE DISCLOSURE

With Segment Routing Traffic Engineering (SR-TE), Topology Independent Loop Free Alternative (TI-LFA) is deployed to achieve local protection with 50 ms switch-over loss bound. FIG. 1 is a network diagram of a SR network 10 illustrating a scenario in TI-LFA where there is not full coverage. The SR network 10 includes four example nodes referred to as N1, N2, N3, N4. The nodes N1, N2, N3, N4 are network elements and can include switches, routers, etc. In this example, there are Segment Identifiers (SID) including node SIDs with labels of 1600X and adjacency SIDs with labels 2400Y. Also, in this example, there is a packet with a label stack 12 for illustration purposes.

When a Point of Local Repair (PLR) (e.g., node N1) detects a failure, the PLR re-routes the traffic based on the incoming topmost SID called "active SID," which is the node SID 16002 in this example. If the failure is due to an adjacent node (e.g., node N2) and the active SID is a node SID of the failed node (e.g., node SID 16002), the PLR needs to re-route the affected traffic around the failed node by examining the SID underneath the active SID on the incoming SID stack. Merchant silicon-based platforms do not have such capability. Another issue is that in case the SID below the active SID is an adjacency SID hosted on the failed node (e.g., 24002 on node N2), the PLR cannot forward the impacted traffic if the adjacency SIDs have local scope. Of course, this problem can be solved via global adjacency SIDs. However, that will require all nodes in an Interior Gateway Protocol (IGP) flooding domain to install forwarding entries for all adjacency SIDs in the domain, and as such this approach does not scale well.

In short, in the present form, TI-LFA solution is unable to provide 100% fault coverage.

BRIEF SUMMARY OF THE DISCLOSURE

The present disclosure relates to systems and methods for a control plane based enhanced Topology Independent Loop Free Alternative (TI-LFA) node protection scheme for Segment Routing Traffic Engineering (SR-TE) paths. The present disclosure provides a pure control plane-based solution to address the aforementioned gaps in TI-LFA node protection. The present disclosure includes the ability of a PLR to act as a proxy for its directly connected neighbors with respect to the adjacency SIDs hosted on those neighbors. The PLR does not flood the adjacency SIDs for which it acts as proxy. A PLR sets up backup path for a node failure such that it swaps the incoming topmost SID (active SID) with its own node SID and forwards the packets to a healthy neighbor. This is to expose the SID underneath the active SID to avoid complex hardware forwarding requirement.

In various embodiments, the present disclosure includes a method having steps, a node in a Segment Routing network configured to implement the steps, and a non-transitory computer-readable medium having instructions stored thereon for programming at least one processor to perform the steps. The steps include learning an adjacency Segment Identifier (SID) of a directly connected neighbor; and programming forwarding entries including a primary path and backup path associated with the adjacency SID.

The programming can be only performed for adjacency SIDs of directly connected neighbors, for use as a Point of Local Repair (PLR). The steps can further include, responsive to a failure, where the node is a Point of Local Repair (PLR), responsive to receiving a packet impacted by the failure, forwarding the packet to a destination based on the failure. The steps can further include determining the adjacency SID is in a label stack; and forwarding the packet to the destination based on having the primary path and backup path associated with the adjacency SID programmed.

The steps can further include, responsive to a failure, where the node is a Point of Local Repair (PLR), and responsive to receiving a packet having an active SID impacted by the failure, replacing the active SID with a node SID of the node; and forwarding the packet to a designated healthy neighbor. The steps can further include receiving the packet from the designated healthy neighbor with the active SID removed; and forwarding the packet to its destination as the PLR. The steps can further include selecting the designated healthy neighbor.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
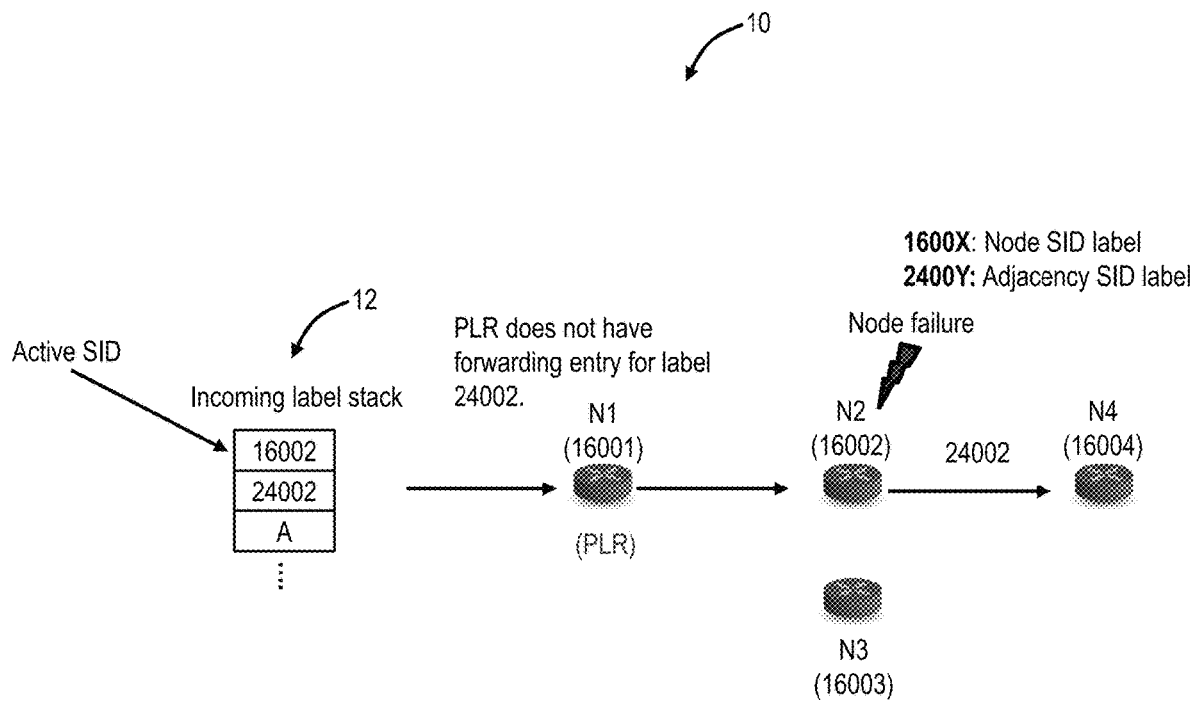
FIG. 1 is a network diagram of a SR network illustrating a scenario in TI-LFA where there is not full coverage.

Again, the present disclosure relates to systems and methods for a control plane based enhanced Topology Independent Loop Free Alternative (TI-LFA) node protection scheme for Segment Routing Traffic Engineering (SR-TE) paths. The present disclosure provides a pure control plane-based solution to address the aforementioned gaps in TI-LFA node protection. The present disclosure includes the ability of a PLR to act as a proxy for its directly connected neighbors with respect to the adjacency SIDs hosted on those neighbors. The PLR does not flood the adjacency SIDs for which it acts as proxy. A PLR sets up backup path for a node failure such that it swaps the incoming topmost SID (active SID) with its own node SID and forwards the packets to a healthy neighbor. This is to expose the SID underneath the active SID to avoid complex hardware forwarding requirement.

Segment Routing Overview

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietforg/html/draft-previdi-6man-segment-routing-header-08) and RFC 8754, "IPv6 Segment Routing Header (SRH)," March 2020, the contents of both are incorporated by reference herein. A segment is encoded as an IPV6 address. An ordered list of segments is encoded as an ordered list of IPV6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPV6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types—an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Engine (PCE) (e.g., when paths span across multiple IGP areas/levels).

Control Plane Enhanced TI-LFA Node Protection Scheme

Of note, even though this document describes the solution assuming SR-MPLS, the solution is equally applicable to SR with IPV6 data-plane (i.e., SRv6) as well.

Figure 2:
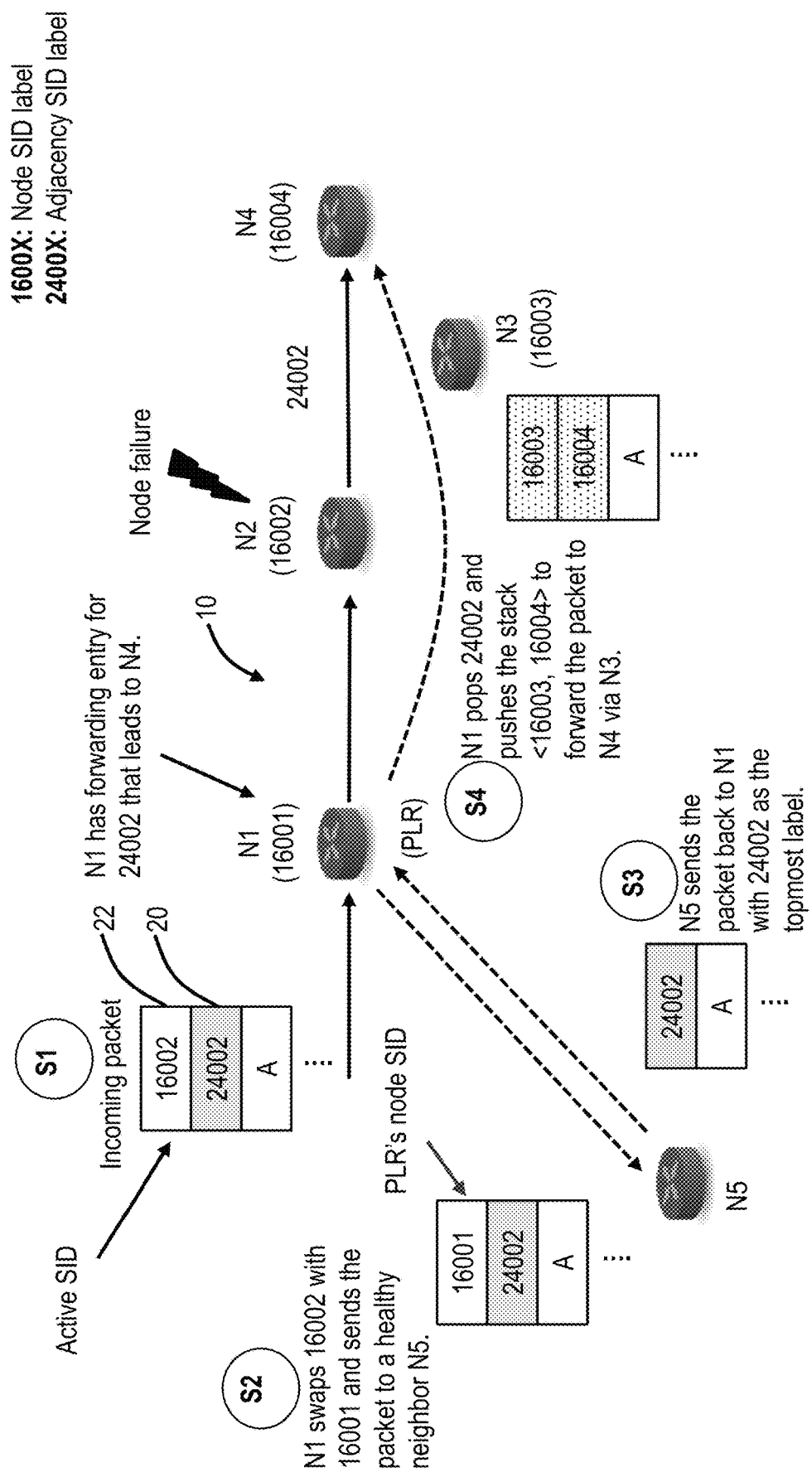
FIG. 2 is a network diagram of the SR network illustrating the proposed approach where a SID below an active SID is an adjacency SID.
Figure 3:
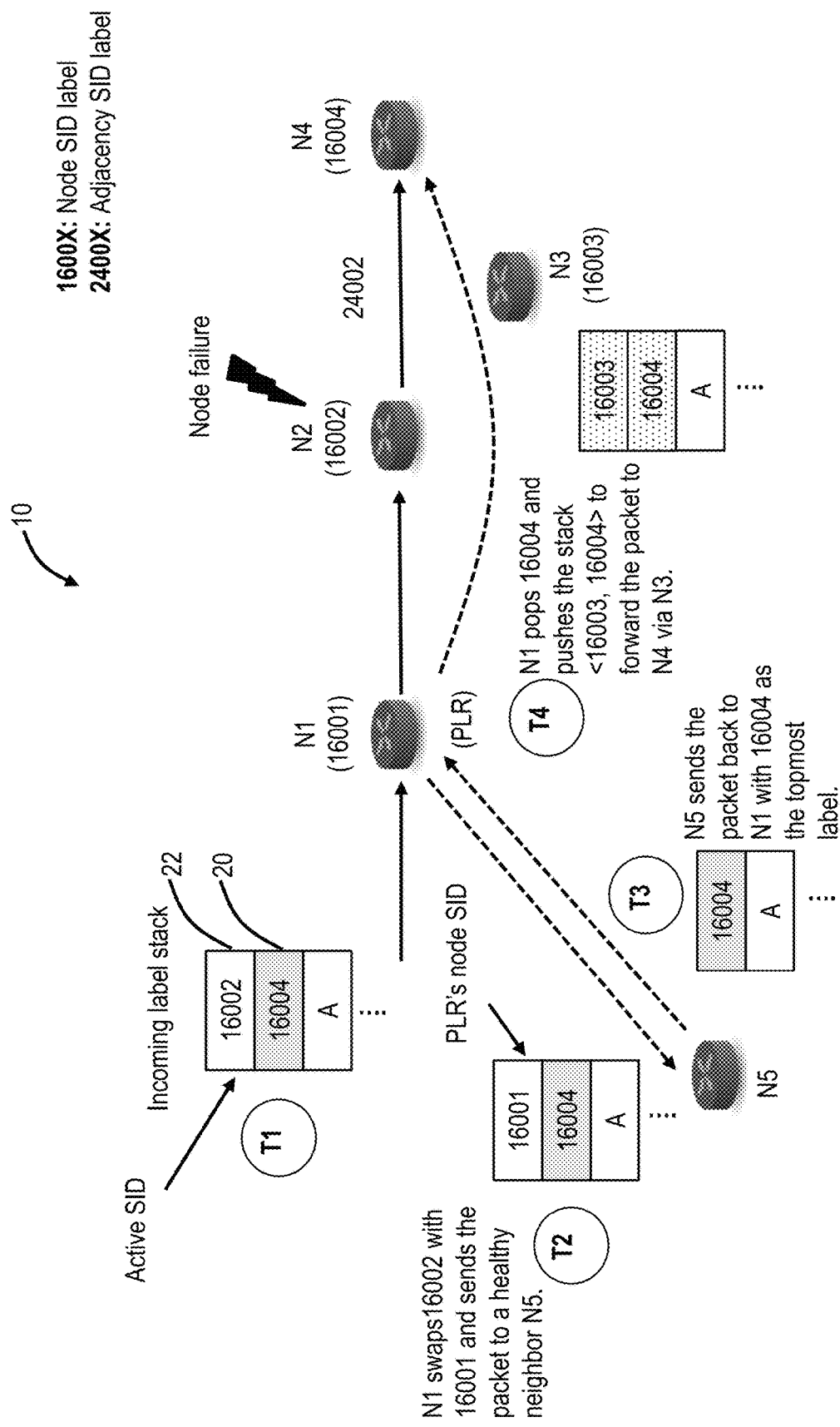
FIG. 3 is a network diagram of the SR network illustrating the proposed approach where a SID below an active SID is a node SID.

FIG. 2 is a network diagram of the SR network 10 illustrating the proposed approach where a SID 20 below an active SID 22 is an adjacency SID. FIG. 3 is a network diagram of the SR network 10 illustrating the proposed approach where a SID 20 below an active SID 22 is a node SID. These examples are presented to illustrate the approach described herein; those skilled in the art will recognize other network configurations or embodiments are also contemplated.

The present disclosure includes two aspects, namely 1) having adjacency SIDs forwarded, maintained, and unique for each PLR and its directly connected neighbors, and 2) forwarding packets from a PLR to any SR-enabled neighbor node over than the protected node in question, to enable removal of an active SID that is a node SID. The present disclosure requires item 1) for any PLR needing to send to an adjacency SID, and item 2) is optional and is used to overcome any platform limitation. These items are implemented via the control plane.

Adjacency SIDs of a PLR and its directly connected neighbors cannot not collide, i.e., these need to be unique, removing the standard convention of local significance, but not requiring global significance. In our examples (FIGS. 2 and 3), the PLR (N1) and node N2 do not share the same adjacency SIDs as they are directly connected. However, nodes N1 and N4 can share the same adjacency SIDs as they are not directly connected. This can be achieved via manually assigning adjacency SIDs to satisfy this condition. Automatic assignment using central entities such as Path Computation Element (PCE) is also possible. Also, the adjacency SIDs can be flooded only to directly connected neighbors, such as via IGP by limiting the flooding scope.

For each adjacency SID on a directly connected neighbor, a PLR creates a backup path that does not pass through that neighbor to reach the downstream node of the corresponding link. In our examples in FIGS. 2 and 3, the PLR (N1) programs a backup forwarding entry with respect to a failure of node N2 such that incoming packets with the topmost label 24002 are forwarded to node N4 (which is the remote end of the corresponding link) via the node N3 to avoid the failed node N2.

In the case of a node failure, if an active SID is the node SID of the failed node, as in FIG. 2, the PLR swaps the active SID with its own node SID and sends the packet to another directly connected healthy neighbor (e.g., node N5). By the virtue of forwarding, the PLR receives its own packet back with the SID beneath the active SID on the original packet as the topmost SID.

If the topmost SID is:

Adjacency SID (e.g., 24002 in FIG. 2) on the failed node (e.g., N2), PLR has forwarding entry created as per step (2) above and hence can successfully forward the packets to the correct receiver (e.g., N4).

Any node SID (e.g., 16004 in FIG. 3) PLR would have naturally installed a backup path avoiding the failed node N3 to successfully forward the packet to the intended recipient (e.g., N4 in FIG. 3).

Note: for a given failure, a PLR forwards impacted traffic only to a single healthy neighbor to minimize out-of-order delivery of packets. Such a neighbor can be chosen a priori by the PLR. If previously chosen healthy neighbor fails, the PLR will choose another healthy neighbor. However, in case of multiple simultaneous failures, sub-50 ms loss bound shall not be guaranteed (which is a general assumption for any protection scheme). To minimize the impact due to multiple failures, a PLR may choose a healthy neighbor based on Shared Risk Link Group (SRLG) diversity.

Recycling is possible. However, there is a cost associated with it. Each recycle entry will require additional HW resource to configure a flow recycle header information. Tunnel statistics require calculation/compensation in telemetry sensor.

This functionality may be enabled by default when TI-LFA is enabled on a node or via a Command Line Interface (CLI). Once enabled, each PLR computes and programs forwarding entries (primary and backup) corresponding to the adjacency SIDs of the directly connected neighbor nodes. Also, for each directly connected neighbor A, a PLR chooses another neighbor B a priori to forward the traffic when neighbor A fails.

With reference to FIG. 2, the example is now described in detail. At step S1, an incoming packet is received having the active SID 22 of 16002 and a second SID 20 of 24002. Note, as previously noted, the PLR node N1 has a forwarding entry for the adjacency SID 24002 that leads to the node N4. Also, there is a node failure of node N2, thus the node N1 is acting as a PLR.

At step S2, the PLR node N1 swaps the active SID 22 of 16002 with a node SID of 16001 for itself (node N1), and sends the packet to its selected healthy neighbor, i.e., the node N5. At step S3, the node N5 sends the packet back to the PLR node N1 with the adjacency SID of 24002 as the topmost label (active SID). At step S4, the PLR node N1 pops the adjacency SID of 24002 and pushes as backup path of node SIDs 16003, 16004 to forward the packet to the node N4, via the node N3.

With reference to FIG. 3, at step T1, an incoming packet is received having the active SID 22 of 16002 and a second SID 20 of 16004. At step T2, the PLR node N1 swaps the active SID 22 of 16002 with a node SID of 16001 for itself (node N1), and sends the packet to its selected healthy neighbor, i.e., the node N5. itself (node N1), and sends the packet to its selected healthy neighbor, i.e., the node N5.

At step T3, the node N5 sends the packet back to the PLR node N1 with the node SID of 16004 as the topmost label (active SID). At step T4, the PLR node N1 pops the node SID of 16004 and pushes as backup path of node SIDs 16003, 16004 to forward the packet to the node N4, via the node N3.

Example Node

Figure 4:
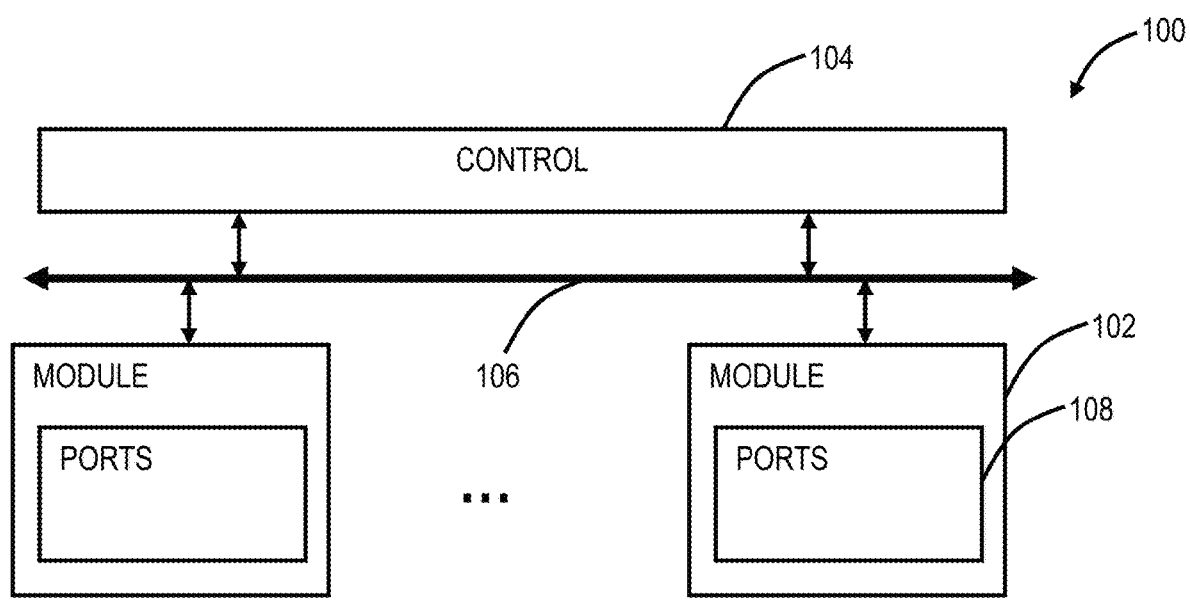
FIG. 4 is a block diagram of an example implementation of a node.

FIG. 4 is a block diagram of an example implementation of a node 100, such as for the node N1-N5 in the network 10. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE 14, the SDN controller 22, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
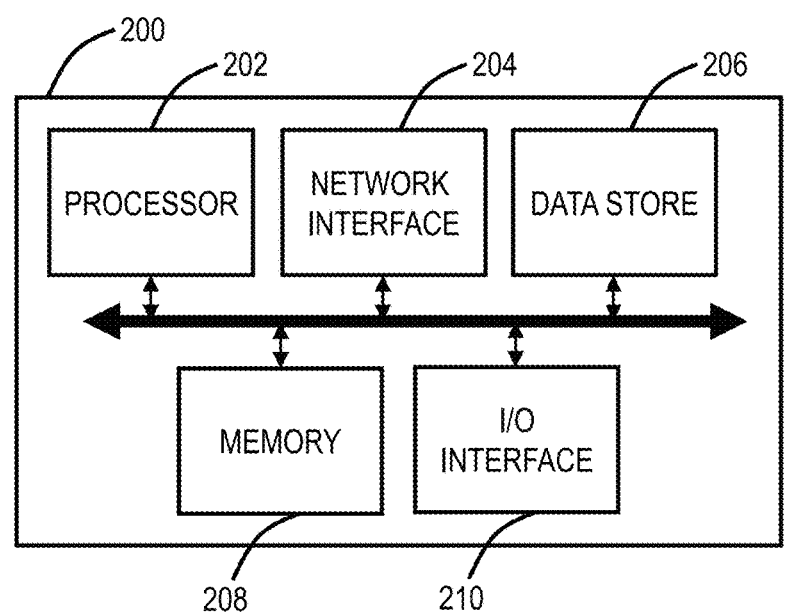
FIG. 5 is a block diagram of an example processing device.

FIG. 5 is a block diagram of an example processing device 200, which can form a control module for the node 100, a PCE, etc. The processing device 200 can be part of the node 100, or a stand-alone device communicatively coupled to the node 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the PCE 14, the SDN controller 22, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM & P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

Figure 6:
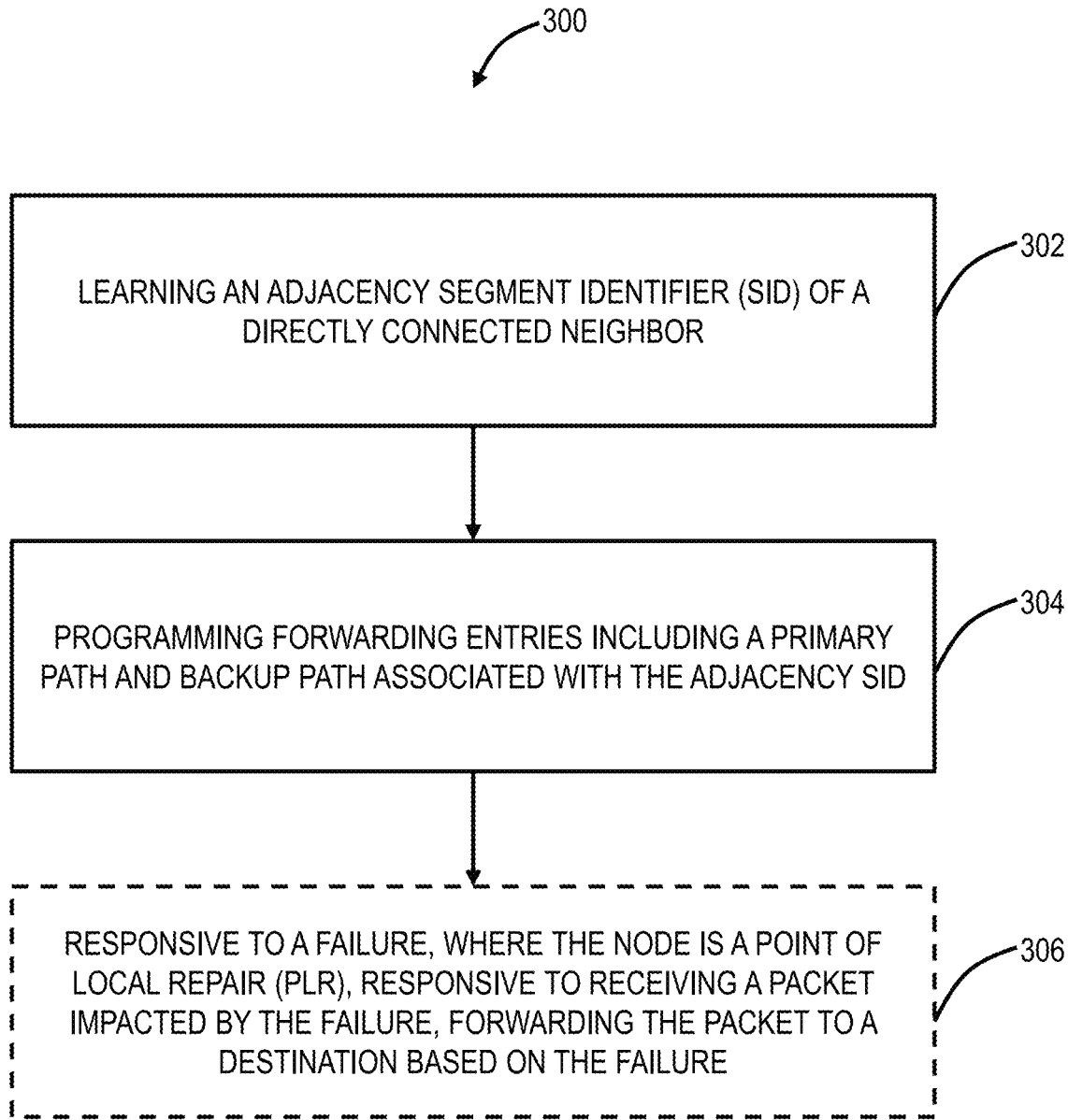
FIG. 6 is a flowchart of a process implemented by a node in a Segment Routing network.

FIG. 6 is a flowchart of a process 300 implemented by a node in a Segment Routing network. The process 300 can be implemented as a method having steps, via a node configured to implement the steps, and/or as instructions stored in a non-transitory computer-readable medium for the steps.

The process 300 includes learning an adjacency Segment Identifier (SID) of a directly connected neighbor (step 302); and programming forwarding entries including a primary path and backup path associated with the adjacency SID (step 304). The programming is only performed for adjacency SIDs of directly connected neighbors, for use as a Point of Local Repair (PLR).

The process 300 can further include, responsive to a failure, where the node is a Point of Local Repair (PLR), responsive to receiving a packet impacted by the failure, forwarding the packet to a destination based on the failure (step 306). The process 300 can further include determining the adjacency SID is in a label stack; and forwarding the packet to the destination based on having the primary path and backup path associated with the adjacency SID programmed.

The process 300 can further include, responsive to a failure, where the node is a Point of Local Repair (PLR), and responsive to receiving a packet having an active SID impacted by the failure, replacing the active SID with a node SID of the node; and forwarding the packet to a designated healthy neighbor. The process 300 can further include receiving the packet from the designated healthy neighbor with the active SID removed; and forwarding the packet to its destination as the PLR. The process 300 can further include selecting the designated healthy neighbor.

Conclusion

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps of:
   in a node in a Segment Routing network, learning an adjacency Segment Identifier (SID) of a directly connected neighbor, wherein flooding of the adjacency SID is limited to the directly connected neighbor; and
   programming forwarding entries including a primary path and backup path associated with the adjacency SID, wherein the programming of the backup path is only performed for the adjacency SID of the directly connected neighbor, for use as a Point of Local Repair (PLR), such that the backup path for the directly connected neighbor does not pass through the directly connected neighbor of the adjacency SID.

2. The method of claim 1, wherein the steps further include
   responsive to a failure, where the node is a Point of Local Repair (PLR), responsive to receiving a packet impacted by the failure, forwarding the packet to a destination based on the failure.

3. The method of claim 2, wherein the steps further include
   determining the adjacency SID is in a label stack; and
   forwarding the packet to the destination based on having the primary path and backup path associated with the adjacency SID programmed.

4. The method of claim 1, wherein the steps further include
   responsive to a failure, where the node is a Point of Local Repair (PLR), and responsive to receiving a packet having an active SID impacted by the failure, replacing the active SID with a node SID of the node; and
   forwarding the packet to a designated healthy neighbor.

5. The method of claim 4, wherein the steps further include
   receiving the packet from the designated healthy neighbor with the active SID removed; and
   forwarding the packet to its destination as the PLR.

6. The method of claim 4, wherein the steps further include
   selecting the designated healthy neighbor.

7. A node, in a Segment Routing network, comprising:
   a plurality of ports interconnected via a switching fabric, wherein the node is configured to
   learn an adjacency Segment Identifier (SID) of a directly connected neighbor, wherein flooding of the adjacency SID is limited to the directly connected neighbor, and
   program forwarding entries including a primary path and backup path associated with the adjacency SID, wherein the forwarding entries for the backup path are programmed only for the adjacency SID of the directly connected neighbor, for use as a Point of Local Repair (PLR), such that the backup path for the directly connected neighbor does not pass through the directly connected neighbor of the adjacency SID.

8. The node of claim 7, wherein the node is further configured to
   responsive to a failure, where the node is a Point of Local Repair (PLR), responsive to receiving a packet impacted by the failure, forward the packet to a destination based on the failure.

9. The node of claim 8, wherein the node is further configured to
   determine the adjacency SID is in a label stack, and
   forward the packet to the destination based on having the primary path and backup path associated with the adjacency SID programmed.

10. The node of claim 7, wherein the node is further configured to
responsive to a failure, where the node is a Point of Local Repair (PLR), and responsive to receiving a packet having an active SID impacted by the failure, replace the active SID with a node SID of the node, and
forward the packet to a designated healthy neighbor.

11. The node of claim 10, wherein the node is further configured to
receive the packet from the designated healthy neighbor with the active SID removed, and
forward the packet to its destination as the PLR.

12. The node of claim 10, wherein the node is further configured to
select the designated healthy neighbor.

13. A non-transitory computer-readable medium comprising instructions that, when executed, cause circuitry in a node to perform steps of:
in a node in a Segment Routing network, learning an adjacency Segment Identifier (SID) of a directly connected neighbor, wherein flooding of the adjacency SID is limited to the directly connected neighbor; and
programming forwarding entries including a primary path and backup path associated with the adjacency SID, wherein the programming of the backup path is only performed for the adjacency SID of the directly connected neighbor, for use as a Point of Local Repair (PLR), such that the backup path for the directly connected neighbor does not pass through the directly connected neighbor of the adjacency SID.

14. The non-transitory computer-readable medium of claim 13, wherein the steps further include
responsive to a failure, where the node is a Point of Local Repair (PLR), responsive to receiving a packet impacted by the failure, forwarding the packet to a destination based on the failure.

15. The non-transitory computer-readable medium of claim 14, wherein the steps further include
determining the adjacency SID is in a label stack; and
forwarding the packet to the destination based on having the primary path and backup path associated with the adjacency SID programmed.

16. The non-transitory computer-readable medium of claim 13, wherein the steps further include
responsive to a failure, where the node is a Point of Local Repair (PLR), and responsive to receiving a packet having an active SID impacted by the failure, replacing the active SID with a node SID of the node; and
forwarding the packet to a designated healthy neighbor.

17. The non-transitory computer-readable medium of claim 16, wherein the steps further include
receiving the packet from the designated healthy neighbor with the active SID removed; and
forwarding the packet to its destination as the PLR.

\* \* \* \* \*